United States Patent
Lee et al.

(10) Patent No.: US 8,207,948 B2
(45) Date of Patent: Jun. 26, 2012

(54) METHOD AND SYSTEMS FOR IDENTIFYING OBJECTS ON A TOUCH-SENSITIVE DEVICE

(75) Inventors: Chia-Yi Lee, Taichung (TW); Wei-Kuo Chang, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 927 days.

(21) Appl. No.: 12/202,798

(22) Filed: Sep. 2, 2008

(65) Prior Publication Data

US 2010/0053091 A1    Mar. 4, 2010

(51) Int. Cl.
*G06F 3/041* (2006.01)

(52) U.S. Cl. ................... 345/173; 178/18.03

(58) Field of Classification Search .......... 345/173–178; 178/18.01–18.09, 18.11
See application file for complete search history.

(56) References Cited

U.S. PATENT DOCUMENTS

| | | | |
|---|---|---|---|
| 5,825,352 A * | 10/1998 | Bisset et al. | 345/173 |
| 7,868,874 B2 * | 1/2011 | Reynolds | 345/173 |
| 2007/0035528 A1 * | 2/2007 | Hodge | 345/174 |
| 2008/0012835 A1 * | 1/2008 | Rimon et al. | 345/173 |

* cited by examiner

*Primary Examiner* — Stephen Sherman
(74) *Attorney, Agent, or Firm* — Hershkovitz & Associates, LLC; Abraham Hershkovitz

(57) ABSTRACT

A method of identifying objects on a touch-sensitive device comprises scanning a plurality of "m" traces of the touch-sensitive device, m being a positive integer, obtaining a count value of each of the "m" traces, wherein an x-th trace has a count value $a_x$, x being an index number from 1 to m, comparing a count value $a_j$ with a count value $a_{j+1}$ in an increasing order of index number in a first comparison process until a count value $a_j$ not smaller than $a_{j+1}$ is identified, and based on the count value $a_j$, comparing the count value $a_j$ with one of count values following $a_j$ in an increasing order of index number in a second comparison process until a count value $a_k$ is identified, wherein a difference between the count values $a_j$ and $a_k$ satisfies a first threshold.

26 Claims, 14 Drawing Sheets

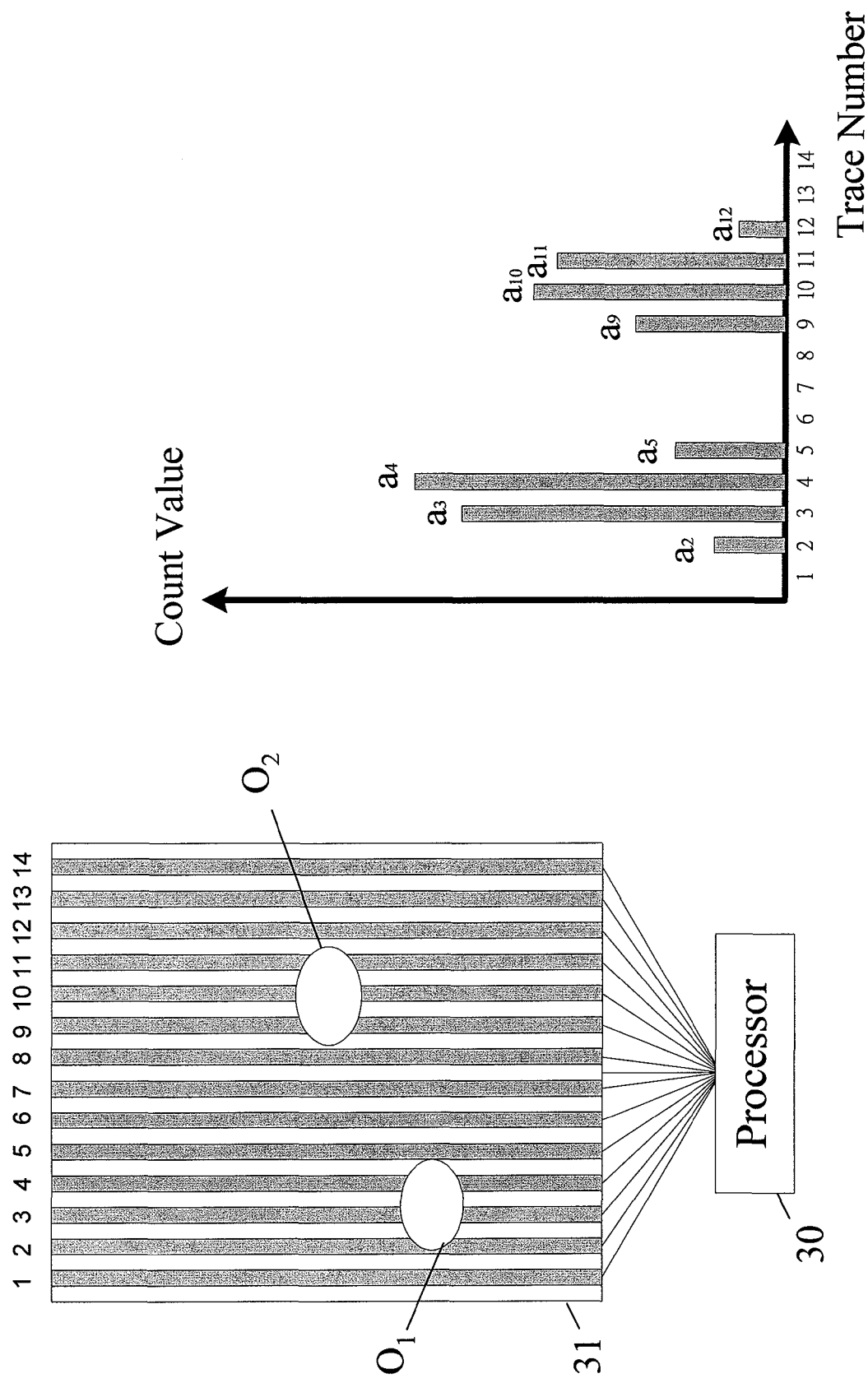

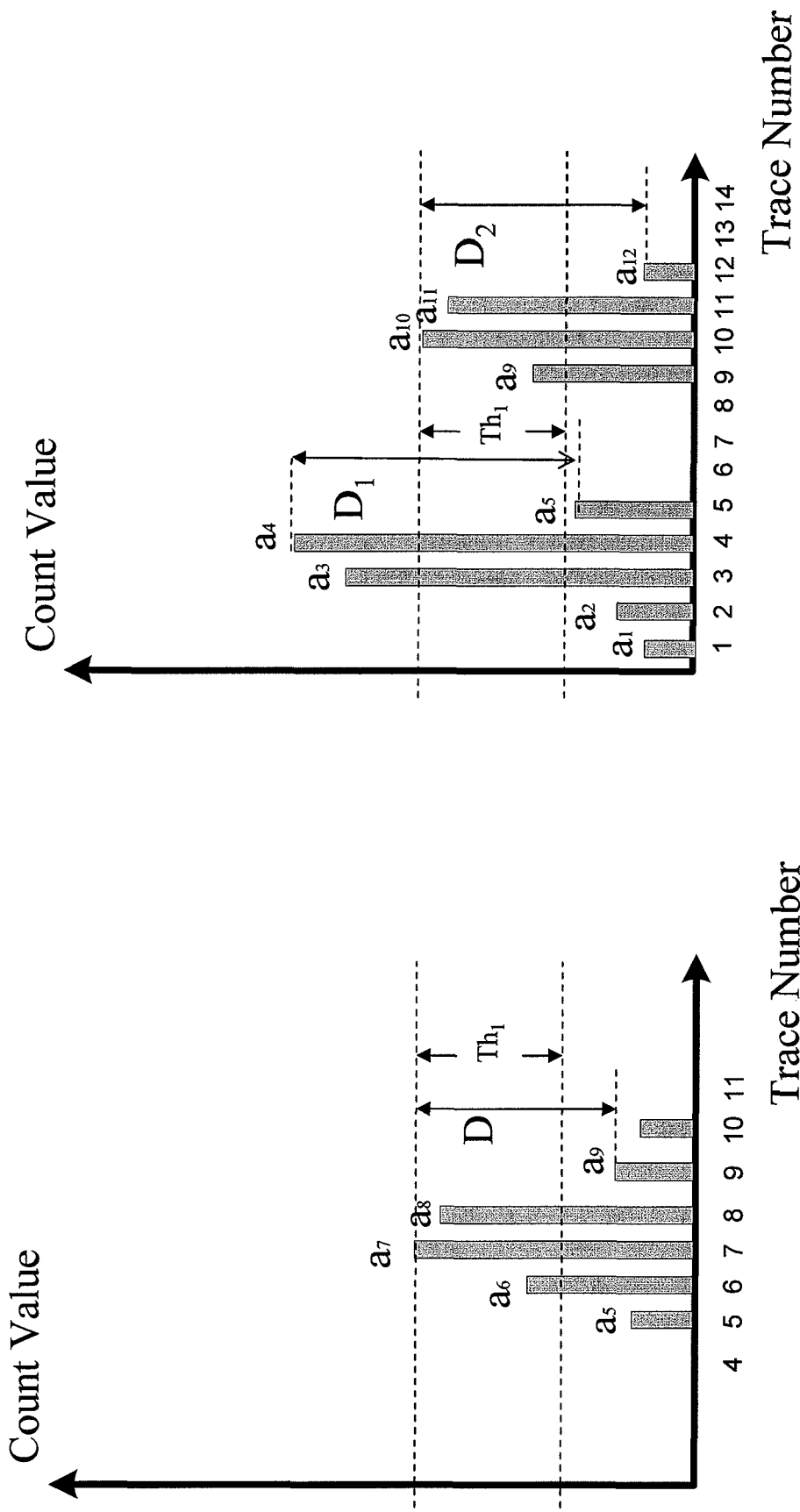

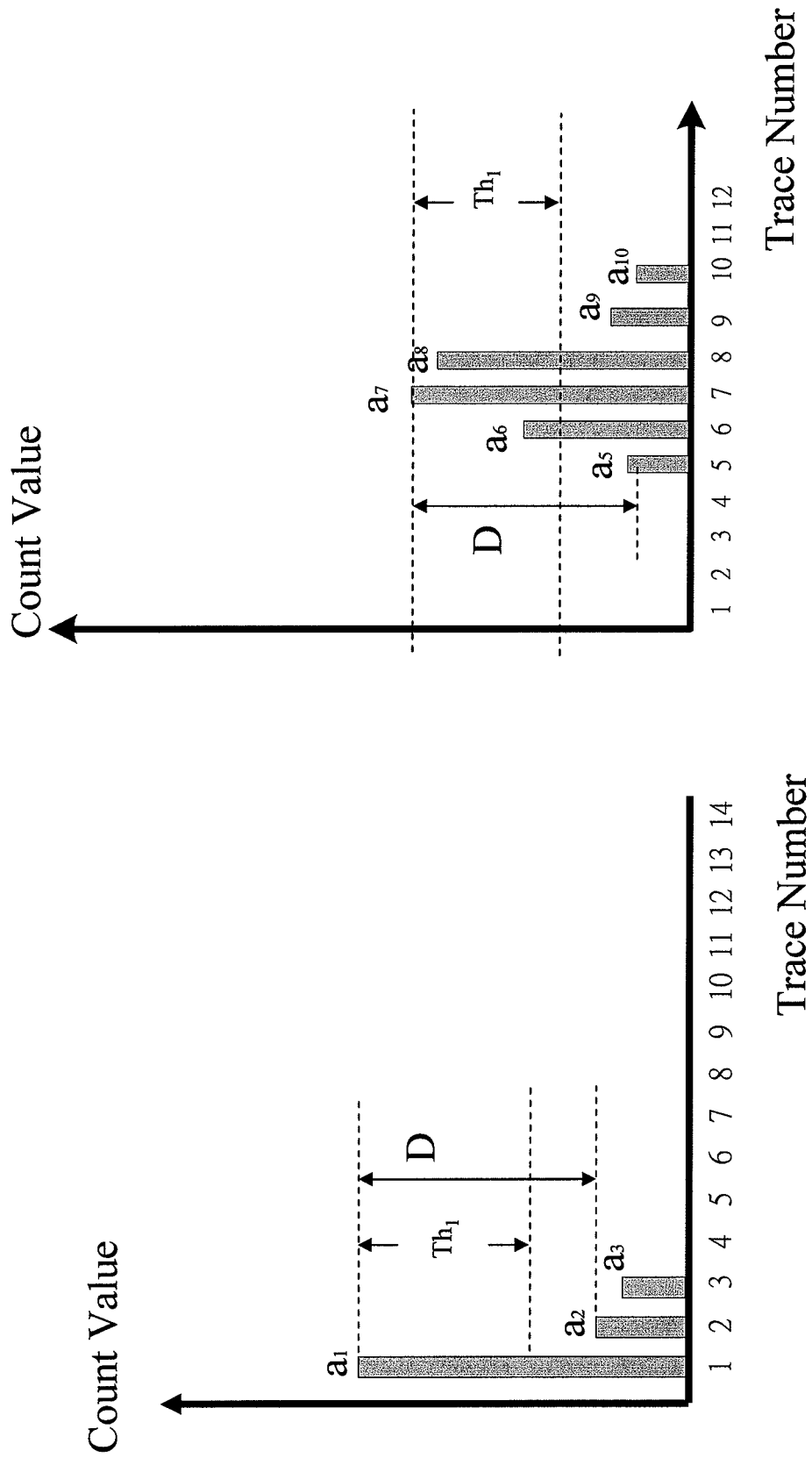

METHOD AND SYSTEMS FOR IDENTIFYING OBJECTS ON A TOUCH-SENSITIVE DEVICE

BACKGROUND OF THE INVENTION

The present invention generally relates to touch-sensitive devices and, more particularly, to methods of and systems for identifying at least one object on a touch-sensitive device.

Electronic products may generally be equipped with at least an input device to interact with users. Input devices, such as keyboards, mice, trackballs, touch pads, keypads and touch screens, are nowadays used as interfaces between users and electronic products. Examples of such electronic products include personal computers, laptops, mobile phones and personal digital assistances (PDAs).

Input devices which adopt touch-sensitive technology may be called touch-sensitive devices. Touch-sensitive devices, for example, touch pads and touch screens, may employ a matrix of row and column electrodes and detect variations in capacitance between row and column electrodes with respect to virtual ground. FIGS. 1A and 1B are schematic diagrams of column and row electrodes arranged within a touch-sensitive device 10 for capacitance detection. Referring to FIG. 1A, the touch-sensitive device 10 may include in a first layer thereof a number of column electrodes 11 having extensions 110 arranged in a pattern to detect capacitive variation when a finger moves along a direction "X" as shown by an arrowhead. Moreover, referring to FIG. 1B, the touch-sensitive device 10 may include in a second layer thereof a number of row electrodes 12 having extensions 120 arranged in a pattern to detect capacitive variation when a finger moves along a direction "Y" as shown by another arrowhead. The first layer shown in FIG. 1A may be disposed over the second layer shown in FIG. 1B (and vice versa) so as to form a matrix of column and row electrodes capable of detecting capacitive variations along both the "X" and "Y" directions.

FIG. 2 is a schematic diagram illustrating a method of recognizing a single finger on a touch-sensitive device such as the touch-sensitive device 10 described and illustrated with reference to FIGS. 1A and 1B. Referring to FIG. 2, a curve 2 may represent count values detected on each column electrode or trace of the touch-sensitive device, wherein each of the count values may be a digital value converted from an analog capacitance value. To recognize whether a finger contacts the touch-sensitive device, the peak "A" of the curve 2, which may have a count value "$c_1$," may be identified. Moreover, a point "B," which may represent a trace "$t_1$" on which a first valid count value may be detected, and a point "C," which may represent a trace "$t_2$" on which a last valid count value may be detected, may also be identified. Parameters "$c_1$," "$t_1$" and "$t_2$" may then be used to determine whether the curve 2 represents a finger by the following formulas:

$$c_1 > \text{Threshold}_{cv} \quad (1)$$

$$(t_2 - t_1) > \text{Threshold}_m \quad (2)$$

where $\text{Threshold}_{cv}$ is a predetermined count value, for example, fifteen (ADC value, arbitrary unit), and $\text{Threshold}_m$ is a predetermined number of traces, for example, two traces. Hence, if the curve 2 satisfies the above formulae (1) and (2) in the current example, namely $c_1 > 15$ (ADC value) and $(t_2 - t_1) > 2$ (traces), it may be identified that a finger represented by the curve 2 contacts the touch-sensitive device.

Nevertheless, with the advancement in electronic products, touch-sensitive devices have been required to allow multiple-finger operation in addition to single-finger operation. During the multiple-finger operation, it may be possible that two or more fingers may simultaneously press the column and row electrodes of the touch-sensitive device, resulting in a curve shape more complicated than the curve 2 in FIG. 2. Consequently, the above-mentioned formulae (1) and (2) may be inadequate for multiple-finger recognition.

BRIEF SUMMARY OF THE INVENTION

Examples of the present invention may provide a method of identifying objects on a touch-sensitive device, the method comprising scanning a plurality of "m" traces of the touch-sensitive device, m being a positive integer, obtaining a count value of each of the "m" traces, wherein an x-th trace has a count value $a_x$, x being an index number from 1 to m, comparing a count value $a_i$ with a count value $a_{i+1}$ in an increasing order of index number in a first comparison process until a count value $a_j$ not smaller than $a_{j+1}$ is identified, and based on the count value $a_j$, comparing the count value $a_j$ with one of count values following $a_j$ in an increasing order of index number in a second comparison process until a count value $a_k$ is identified, wherein a difference between the count values $a_j$ and $a_k$ satisfies a first threshold.

Some examples of the present invention may also provide a method of identifying objects on a touch-sensitive device, the method comprising scanning a plurality of "m" traces of the touch-sensitive device, m being a positive integer, obtaining a count value of each of the "m" traces, wherein an x-th trace has a count value $a_x$, x being an index number from 1 to m, identifying a non-zero count value $a_i$ having an index number most close to the first index number of a first count value $a_1$, i being an integer from 1 to m, comparing the count value $a_i$ with a count value $a_{i+1}$, if the count value $a_i$ is not smaller than the count value $a_{i+1}$, based on the count value $a_i$, comparing the count value $a_i$ with one of count values following $a_i$ in an increasing order of index number in a first comparison process until a count value $a_j$ is identified, wherein a difference between the count values $a_i$ and $a_j$ satisfies a first threshold; and if the count value $a_i$ is smaller than the count value $a_{i+1}$, based on the count value $a_i$, comparing the count value $a_i$ with one of count values following $a_i$ in an increasing order of index number in a second comparison process until a count value $a_k$ is identified, wherein a difference between the count values $a_i$ and $a_k$ satisfies the first threshold.

Examples of the present invention may further provide a method of identifying objects on a touch-sensitive device, the method comprising scanning a plurality of traces of the touch-sensitive device, obtaining count values of the plurality of traces, each of the count values having an index number related to the location of one of the traces, identifying a first count value in a first portion of the count values, the first count value having one of a local maximum value and a local minimum value among the first portion of the count values, determining whether a difference between the first count value and one of count values following the first count value satisfies a first threshold, and identifying a first object if the difference between the first count value and the one count value satisfies the first threshold.

Examples of the present invention may further provide a system for identifying objects on a touch-sensitive device, the system comprising a detection device configured to scan a plurality of "m" traces of the touch-sensitive device, m being a positive integer, a converter configured to generate a count value of each of the "m" traces, wherein an x-th trace has a count value $a_x$, x being an index number from 1 to m, a first comparator configured to compare a count value $a_i$ with a count value $a_{i+1}$ in an increasing order of index number in a first comparison process until a count value $a_j$ not smaller than $a_{j+1}$ is identified, and a second comparator configured to based on the count value $a_j$, compare the count value $a_j$ with one of count values following $a_j$ in an increasing order of index number in a second comparison process until a count value $a_k$ is identified, wherein a difference between the count values $a_i$ and $a_k$ satisfies a first threshold.

Examples of the present invention may further provide a system for identifying objects on a touch-sensitive device, the system comprising a detection device configured to scan a plurality of "m" traces of the touch-sensitive device, m being a positive integer, a converter configured to generate a count value of each of the "m" traces, wherein an x-th trace has a count value $a_x$, x being an index number from 1 to m, a first comparator configured to identify a non-zero count value $a_i$ having an index number most close to the first index number of a first count value $a_1$, i being an integer from 1 to m, and compare the count value $a_i$ with a count value $a_{i+1}$, wherein the first comparator, if the count value $a_i$ is not smaller than the count value $a_{i+1}$, based on the count value $a_i$, compares the count value $a_i$ with one of count values following $a_i$ in an increasing order of index number in a first comparison process until a count value $a_j$ is identified, wherein a difference between the count values $a_i$ and $a_j$ satisfies a first threshold, and a second comparator configured to, if the count value $a_i$ is smaller than the count value $a_{i+1}$, based on the count value $a_i$, compare the count value $a_i$ with one of count values following $a_i$ in an increasing order of index number in a second comparison process until a count value $a_k$ is identified, wherein a difference between the count values $a_i$ and $a_k$ satisfies the first threshold.

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments of the invention. It is understood, however, that the invention is not limited to the precise arrangements and instrumentalities shown. In the drawings:

FIG. 3B is a schematic diagram of a detection device and a processor of the system illustrated in FIG. 3A;

FIG. 3C is a schematic diagram of exemplary count values of a number of traces;

FIGS. 5A to 5D are diagrams illustrating exemplary operations of the method illustrated in FIG. 4;

FIGS. 9A to 9D are diagrams illustrating exemplary operations of the method illustrated in FIG. 8.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Figures 1A, 1B:
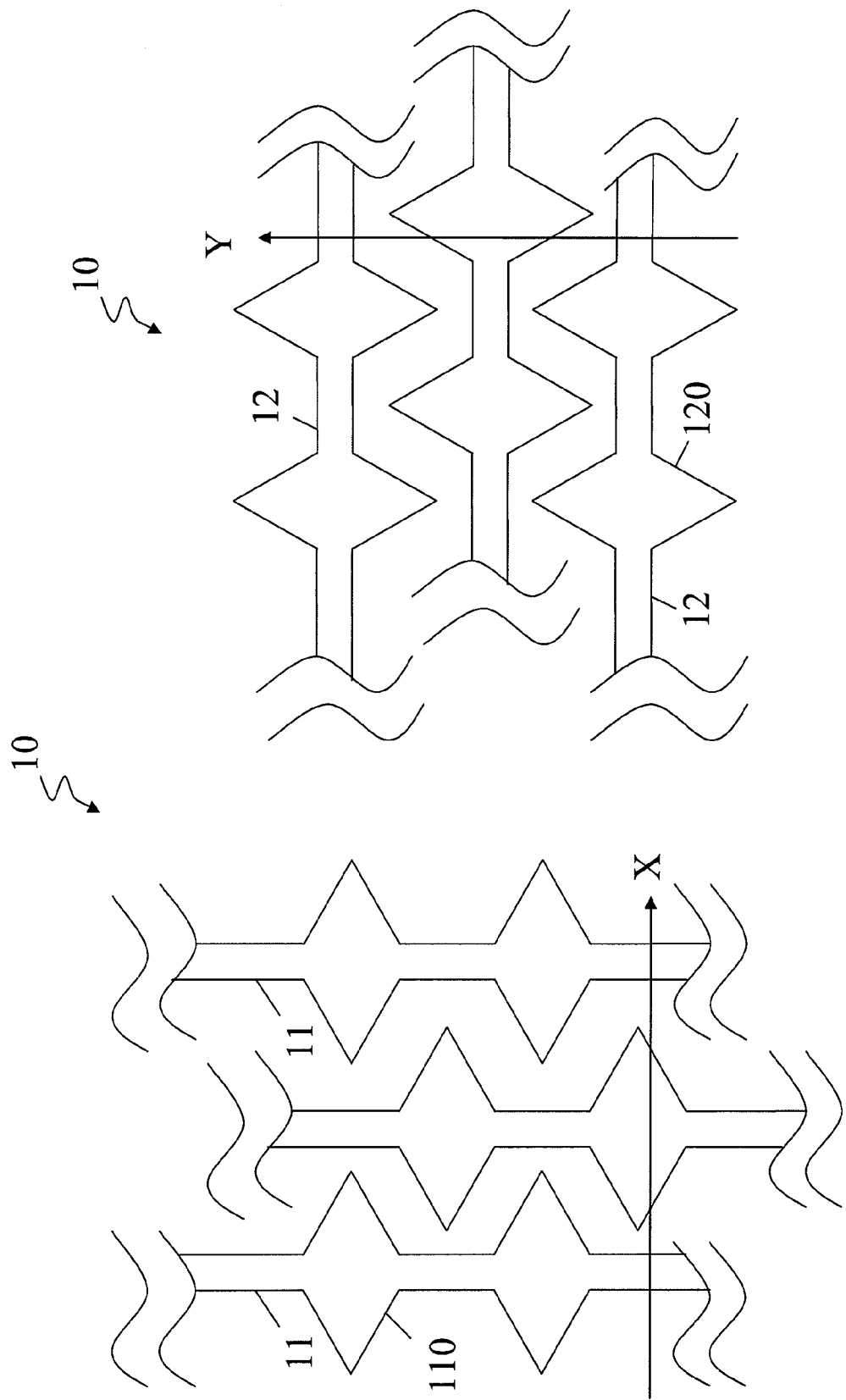
FIGS. 1A and 1B are schematic diagrams of column and row electrodes arranged within a touch-sensitive device for capacitance detection.
Figure 2:
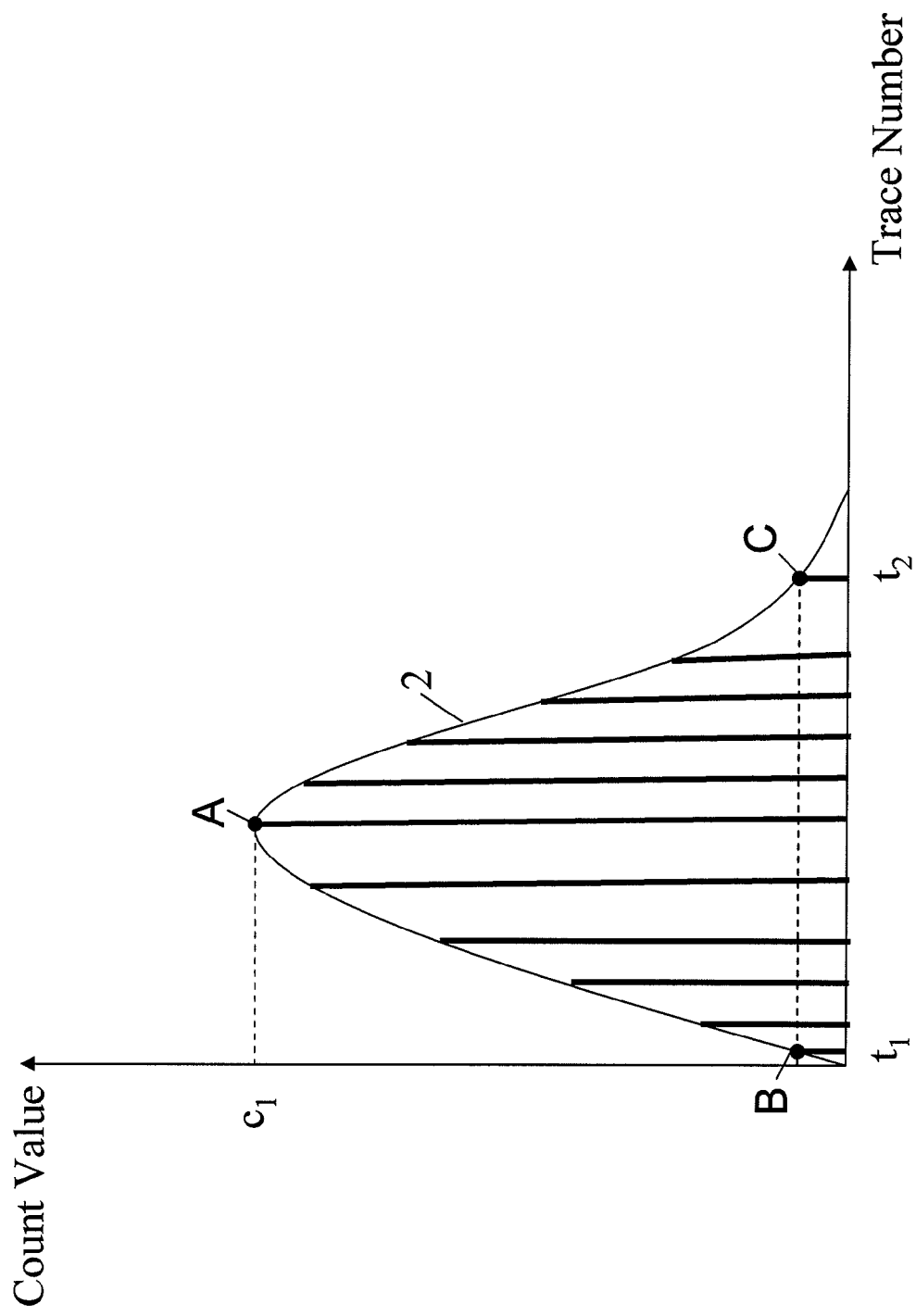
FIG. 2 is a schematic diagram illustrating a method of recognizing a single finger on a touch-sensitive device.
Figure 3A:
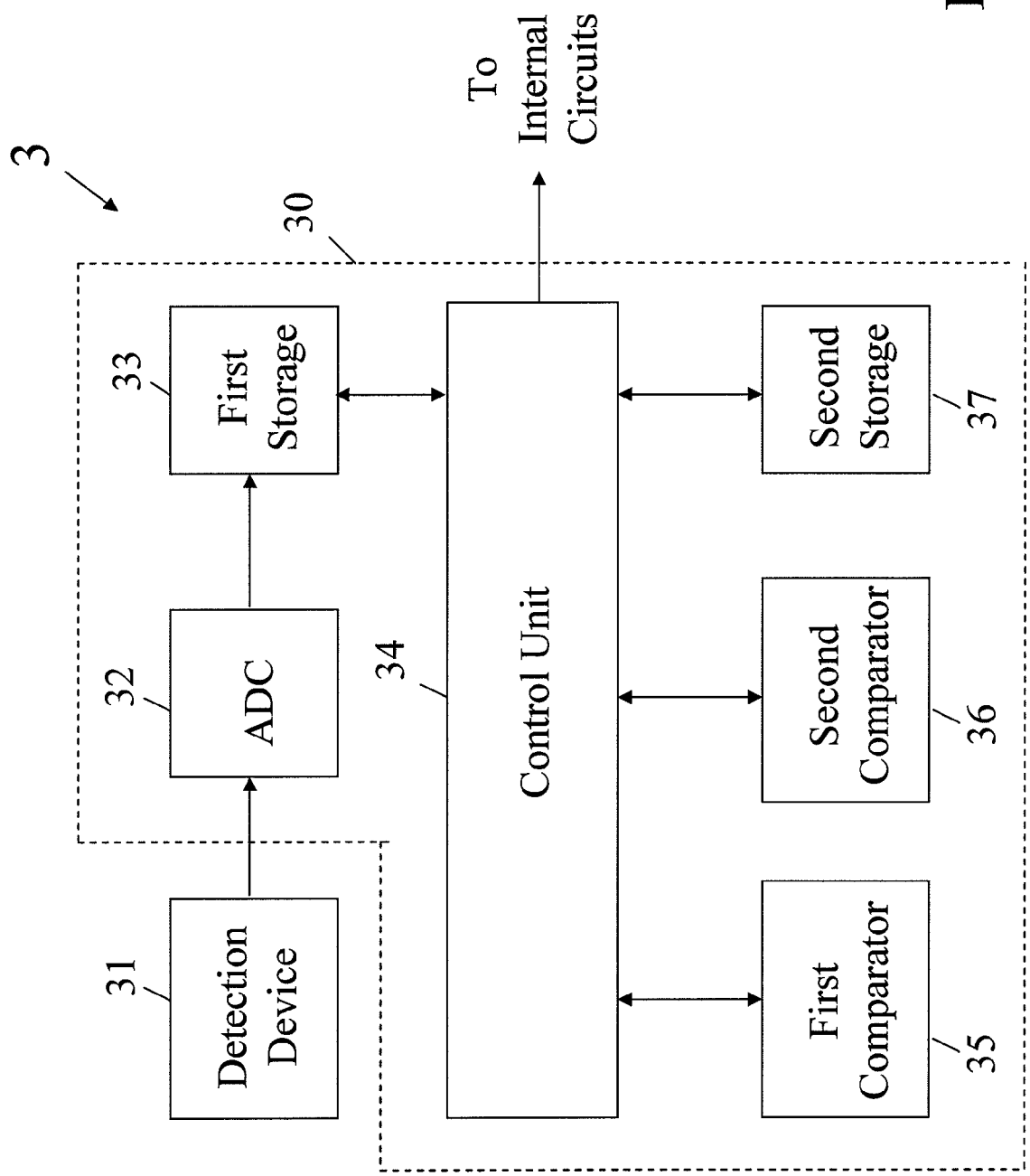
FIG. 3A is block diagram of a system for multiple-finger recognition consistent with an example of the present invention.

FIG. 3A is schematic diagram of a system 3 for multiple-finger recognition consistent with an example of the present invention. Referring to FIG. 3A, the system 3 may include a detection device 31 and a processor 30. The processor 30 may further include an analog-to-digital converter (ADC) 32, a first storage 33, a control unit 34, a first comparator 35, a second comparator 36 and a second storage 37. The detection device 31 may include but is not limited to a touch pad or touch screen capable of detecting the presence of a force or pressure from an object such as a finger or stylus. The detection device 31 may include a matrix of electrodes (not shown) formed in rows and columns and generate an analog signal in response to a force applied thereto. The analog signal may contain information on the change in capacitance due to the force applied to the column and row electrodes and may be converted into digital count values at the ADC 32. The count values may be transmitted to and stored in the first storage 33.

The control unit 34 may be configured to retrieve count values from the first storage 33 and send the same to the first comparator 35 for a first comparison. A comparison result of each first comparison may be sent to and stored in the second storage 37 via the control unit 34. The count values stored in the second storage 37 after the first comparison may be used in a second comparison to identify whether one or more object may exist. The second storage 37 may also store parameters such as thresholds to facilitate the second comparison. The control unit 34 may retrieve the first and second thresholds and count values from the second storage 37 and send the same to the second comparator 36 for the second comparison. A result of the second comparison may be sent to the internal circuits of a host device (not shown).

In one example, the processor 30 may be integrated in a single chip or incorporated into the host device. Furthermore, each of the storages 33 and 37 may include but is not limited to one of a register, flash memory, random-access memory (RAM) and cache. Alternatively, the storages 36 and 37 may be replaced by a single storage, of which a first section and a second section may be partitioned to store data related to the first comparison and the second comparison, respectively.

FIG. 3B is a schematic diagram of the detection device 31 and the processor 30 of the system 3 illustrated in FIG. 3A. Referring to FIG. 3B, the detection device 31 may include a number of traces labeled "1" to "14," which may further include column electrodes overlapping row electrodes, and vice versa. In one example, the detection device 31 may have a size of 20 row electrodes by 16 column electrodes. In another example, the detection device 31 may have a size of 16 row electrodes by 12 column electrodes. Skilled persons in the art will understand that other sizes of the detection device 31 may be designed to suit different applications. In operation, a first object $O_1$ and a second object $O_2$, when press on the traces, may result in capacitance change detectable by the detection device 31.

FIG. 3C is a schematic diagram of exemplary count values of the traces numbered 1 to 14 illustrated in FIG. 3B. The capacitance changes detected by the detection device 31 may be converted into count values in the ADC 32. Referring to FIG. 3C, the distribution of the count values on the traces 1 to 14 with respect to an object may include a bell distribution. Also referring to FIG. 3B, count values $a_2$ to $a_5$ related to the first object $O_1$ and count values $a_9$ to $a_{12}$ related to the second object $O_2$ may be generated by the ADC 32. In the present example, the count values of the traces 6 to 8 are approximately zero because no objects are detected and thus no capacitance has changed. Based on the count values, the first object $O_1$ and the second object $O_2$ may be identified by methods to be discussed below.

Figure 4:
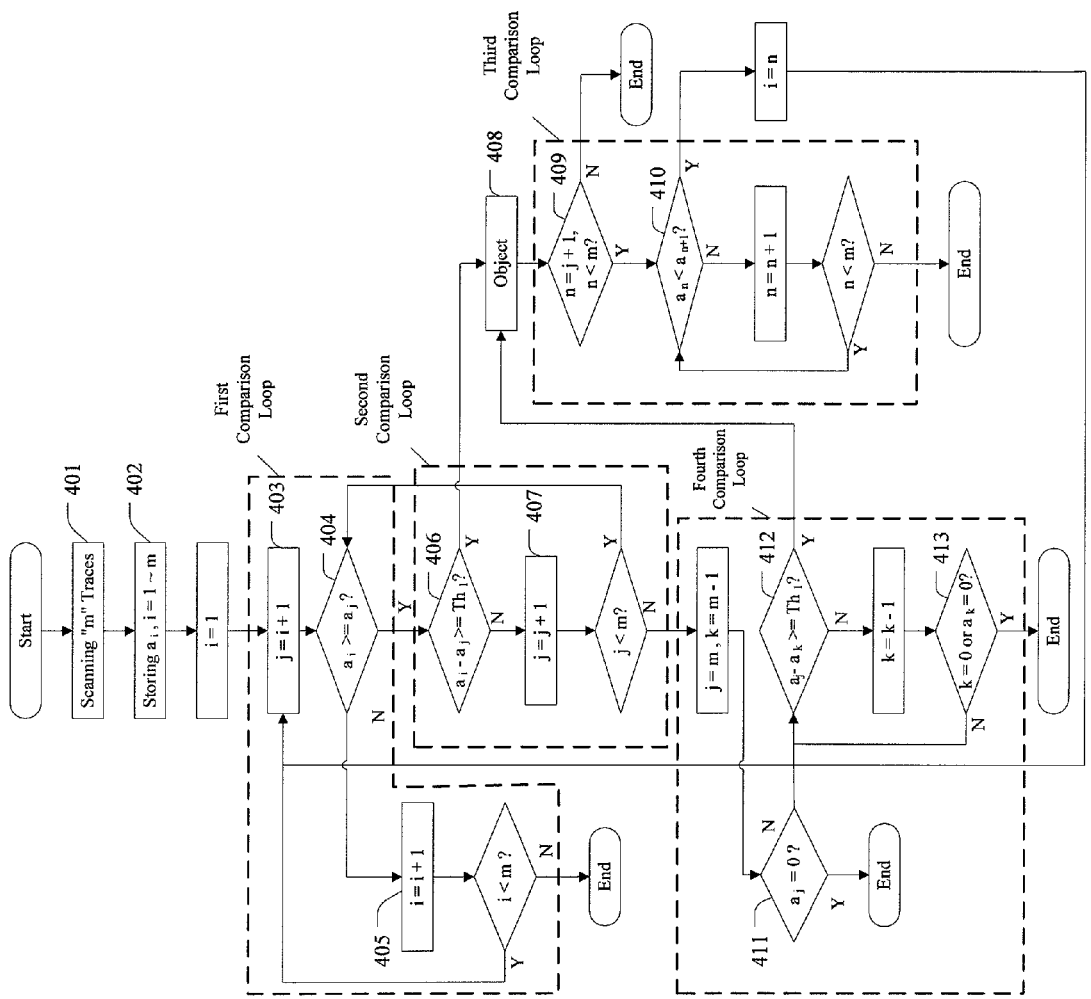
FIG. 4 is a flow diagram of a method of multiple-finger recognition consistent with an example of the present invention.

FIG. 4 is a flow diagram of a method of multiple-finger recognition consistent with an example of the present invention. FIG. 4 may provide an overall process flow of the method while FIGS. 5A to 5D may provide exemplary operations of the method. Referring to FIG. 4 and also FIG. 3A, at step 401, a number of "m" traces of a detection device such as the detection device 31 may be scanned, m being a positive integer. The variation of capacitance in each of the "m" traces may be converted into a count value by the ADC 32. In one example, the count value $a_i$, "i" being an index from 1 to m, may range from 0 to 255, given an 8-bit ADC. The count values of the "m" traces, i.e., $a_i$ to $a_m$, may be stored in the first storage 33.

Next, count values may be retrieved from the first storage 33 by index in an increasing order for comparison in a first comparison loop including steps 403 to 405. Specifically, at step 404, the count value $a_1$ of the trace "1" may be compared with the count value $a_2$ of the trace "2" at the first comparator 35 to determine whether $a_1$ is greater than or equal to $a_2$. If not, through steps 405 and 403, the first comparator 35 may compare the count values $a_2$ and $a_3$. The comparison between count values $a_i$ and $a_{i+1}$ may be repeated in an increasing order of index through steps 403 and 405 until a count value $a_i$ passes the test at step 404.

If a count value $a_i$ is found to be greater than or equal to $a_j$ at step 404, the count value $a_i$ may be stored in the second storage 37. Based on the count value $a_i$, it may then be determined at step 406 at the second comparator 36 in a second comparison loop whether a difference between the count value $a_i$ and a count value $a_j$ corresponding to a trace "j" following the trace "i" is greater than or equal to a first threshold $Th_1$, "j" being an index greater than "i". The count value $a_j$ may be retrieved by the control unit 34 from the first storage 33, while the count value $a_i$ and the first threshold $Th_1$ may be retrieved by the control unit 34 from the second storage 37. The control unit 34 may then send the count values $a_i$ and $a_j$ and the first threshold $Th_1$ to the second comparator 35. If $a_i$ passes the test at step 406, it may be determined at step 408 that a first object is identified.

Next, in a third comparison loop, the remaining count values may be retrieved at step 409 and compared at step 410 so as to identify whether a second object exists. At step 410, the count value $a_n$ may be compared with the count value $a_{n+1}$ at the first comparator 35 to determine whether $a_n$ is smaller than $a_{n+1}$. If not, it may be determined that traces "n" and "n+1" respectively corresponding to the count values $a_n$ and $a_{n+1}$ are related to the first object already identified due to the nature of bell distribution, or the traces "n" and "n+1" are not contacted by any objects. Either way, the third comparison loop including the steps 409 and 410 may be repeated until all of the remaining count values are checked or a count value $a_n$ smaller than $a_{n+1}$ is found. If a count value $a_n$ passes the test at step 410, the first comparison loop including steps 403 to 405 may be repeated. If at step 406 a second object is identified, the third comparison loop may be repeated in order to detect whether a third object exists.

If none of the count values passes the test at step 406, the count values may be retrieved by index in a decreasing order for comparison in a fourth comparison loop so as to identify whether an object exists at a marginal portion of the detection device 31. At step 411, a non-zero count value $a_j$ having an index number most close to the last index number may be identified. At step 412, based on the count value $a_j$, it may be determined whether a difference between the count value $a_j$ and a count value $a_k$ following is greater than or equal to the first threshold $Th_1$. If not, the count value $a_j$ may be compared with a count value $a_{k-1}$ following the count value $a_k$. The test through steps 412 to 413 based on the first threshold $Th_1$ may be repeated until all of the previous count values $a_k$ are compared with the count value $a_j$. If at step 412 an enough difference is found, it may be determined at step 408 that an object is identified.

Figures 5C, 5D:
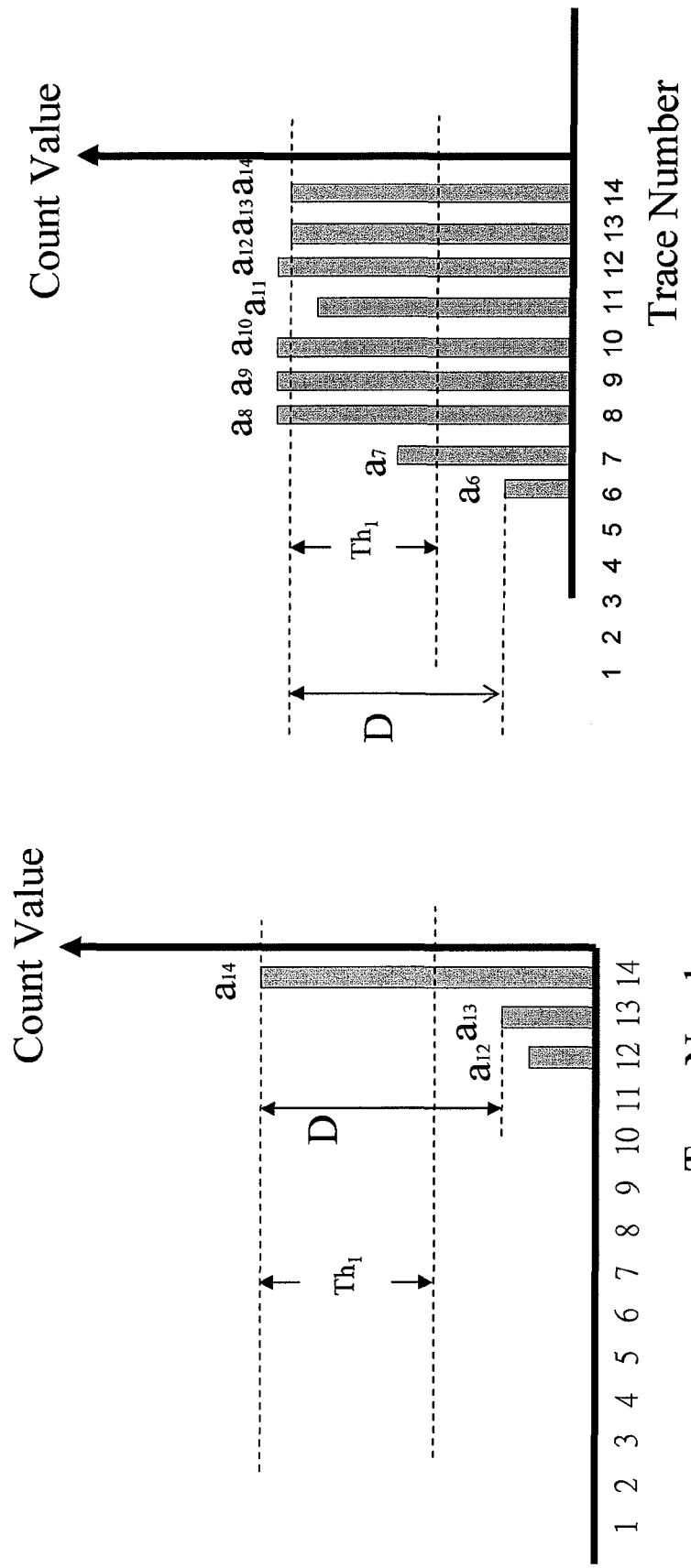

FIGS. 5A to 5D are diagrams illustrating exemplary operations of the method illustrated in FIG. 4. Referring to FIG. 5A and also FIG. 4, a count value $a_7$ may be identified at step 404. Based on the count value $a_7$, step 406 may be performed using the first threshold $Th_1$ to identify whether any of subsequent count values may pass the test. A count value $a_9$ may be identified at step 406 to have a difference "D" from the count value $a_7$, D being greater than or equal to the first threshold $Th_1$. Accordingly, an object may be identified at step 408.

Referring to FIG. 5B, count values $a_4$ and $a_5$ may be identified at steps 404 and 406, respectively. A first object may then be identified at step 408 because a difference $D_1$ between the count values $a_4$ and $a_5$ is greater than the first threshold $Th_1$. Next, at step 409, it may be determined that n=j+1=5+1=6 is an initial value for step 410. Accordingly, count values $a_6$ and $a_7$ are compared at step 410. The comparison at step 410 may be repeated until $a_9$ is identified, which is smaller than $a_{10}$. Next, $a_{10}$ and $a_{12}$ may be identified at steps 404 and 406, respectively. A second object may then be identified at step 408 because a difference $D_2$ between the count values $a_{10}$ and $a_{12}$ is greater than the first threshold $Th_1$.

Once in a while an object may contact a marginal region of the detection device 31. Referring to FIG. 5C, all count values may fail the tests at steps 404 and 406 respectively in the first and second comparison loops and then the fourth comparison loop may start. A count value $a_{14}$, which corresponds to the last trace numbered 14 in the present example, may be identified at step 406, which has an enough distance "D" from the count value $a_{13}$ and hence an object may be identified at step 408.

Referring to FIG. 5D, a strong force may be applied to the detection device 31, resulting in a group of consecutive peak count values. A count value $a_8$ may be identified at step 404. However, no subsequent count values are found to have an enough difference from the count value $a_8$. The fourth comparison loop may subsequently start. At step 406, a count value $a_6$ may be identified to have an enough distance "D" from a count value $a_{14}$ and accordingly an object may be identified at step 408.

Figure 6:
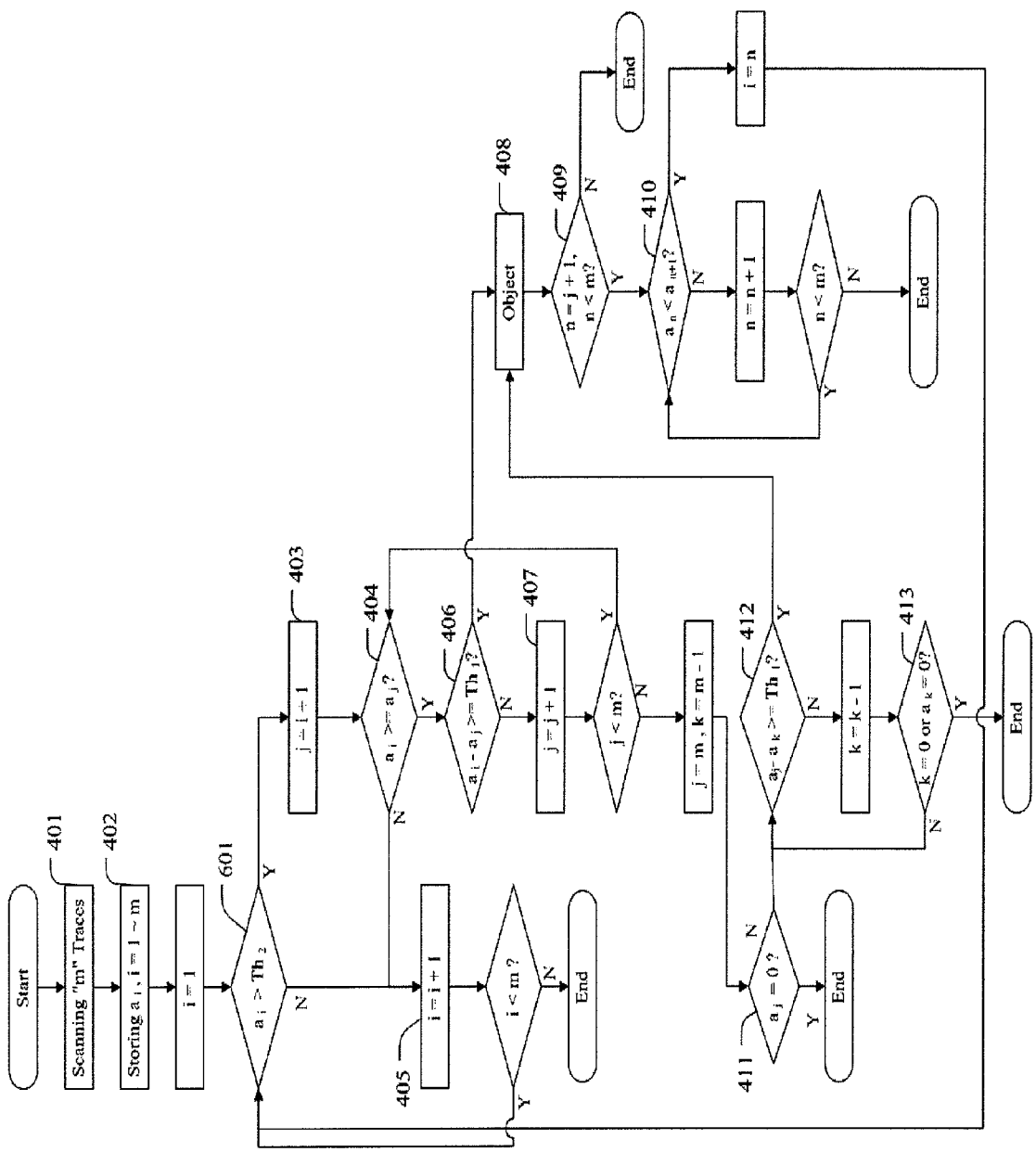
FIG. 6 is a flow diagram of a method of multiple-finger recognition consistent with another example of the present invention.
Figures 7A, 7B:
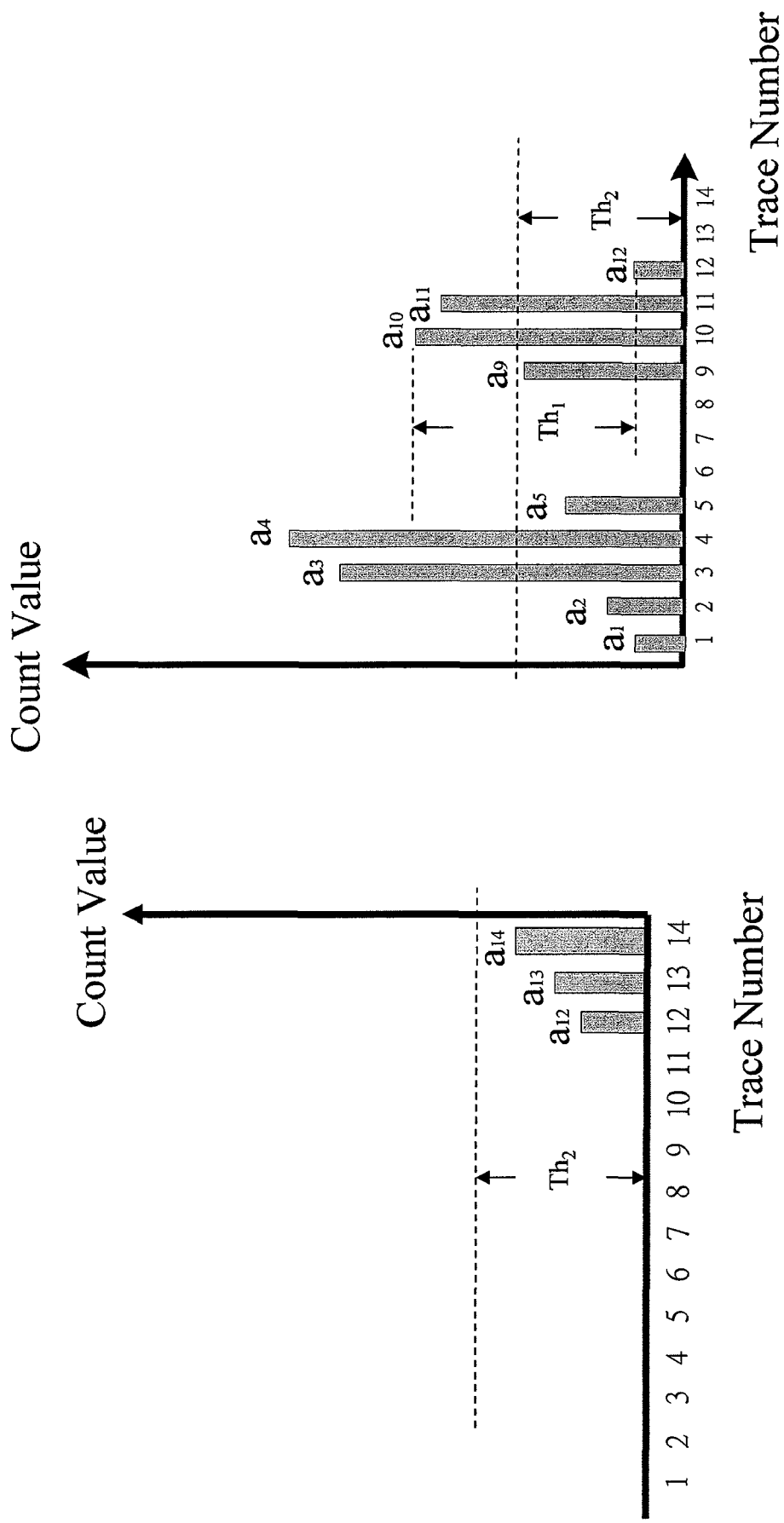
FIGS. 7A to 7C are diagrams illustrating exemplary operations of the method illustrated in FIG. 6.
Figure 7C:
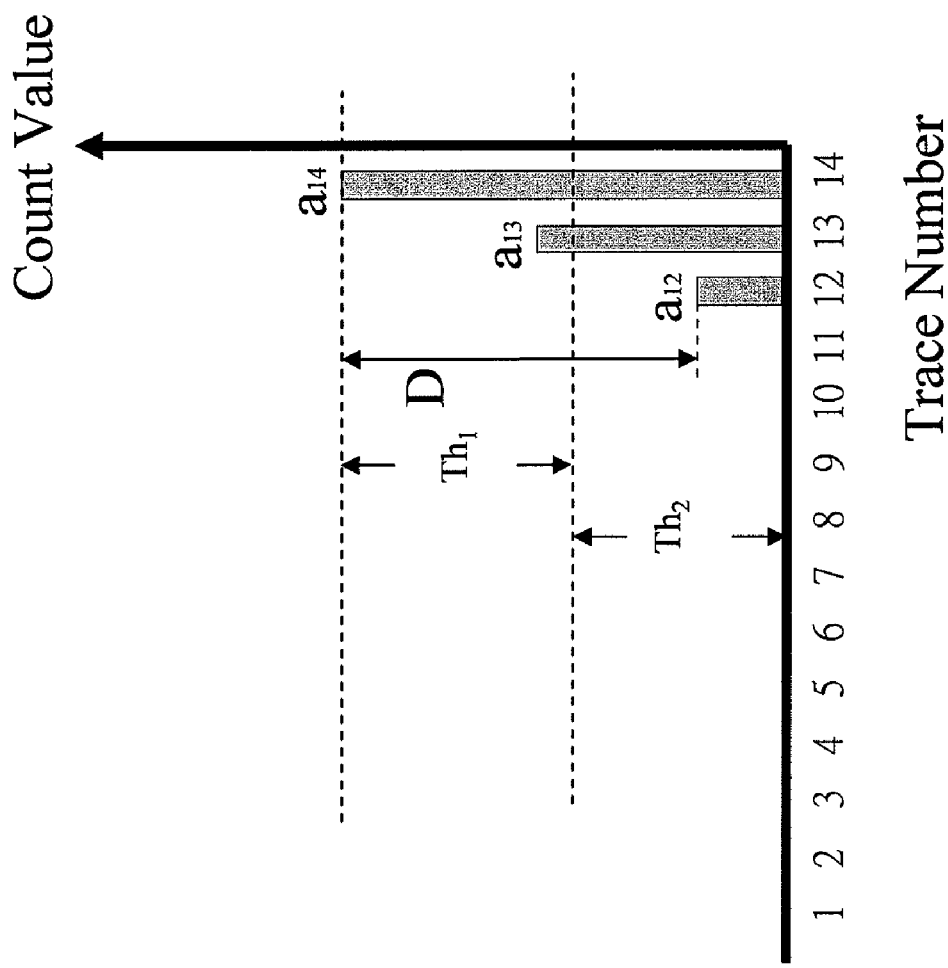

FIG. 6 is a flow diagram of a method of multiple-finger recognition consistent with another example of the present invention. FIGS. 7A to 7C provide exemplary operations of the method illustrated in FIG. 6. Referring to FIG. 6, the method may be similar to that described and illustrated with reference to FIG. 4 except that, for example, a comparison based on a second threshold is employed. Specifically, at step 601, a count value $a_i$ with an initial index value i=1 may be compared in one of the first comparator 33 and the second comparator 36 with a second threshold $Th_2$ from the second storage 37. Steps 601 and 405 may be repeated until a count value $a_i$ greater than or equal to the second threshold $Th_2$ is detected. If all of the count values fail to pass the test at step 601, as in an example illustrated in FIG. 7A, the count values may be deemed insignificant and accordingly no object may be identified. An insignificant count value may result from, for example, noise.

If a count value $a_i$ passes the test at step 601, the first comparison loop through steps 403 to 405 based on the first threshold $Th_1$ may be performed. Referring to FIG. 7B, the comparison for count values $a_1$, $a_2$ and $a_2$, $a_3$ may be eliminated in determining the presence of a first object and, moreover, the comparison for count values $a_9$, $a_{10}$ may also be eliminated in determining the presence of a second object. The second threshold $Th_2$ may thus facilitate the recognition process. Count values $a_3$ may be identified at step 601 and subsequently $a_4$ and $a_5$ may be identified at steps 404 and 406, thereby identifying a first object. Furthermore, count values $a_{10}$ may be identified at step 601 and subsequently $a_{10}$ and $a_{12}$ may be identified at steps 404 and 406, thereby detecting a second object.

Referring to FIG. 7C, a count value $a_{14}$ passes the test at step 601 and the fourth comparison loop may start because $a_{14}$ is the last count value. A count value $a_{12}$ is found to have an enough difference from the count value $a_{14}$ and thus an object may be identified at step 408.

Figure 8:
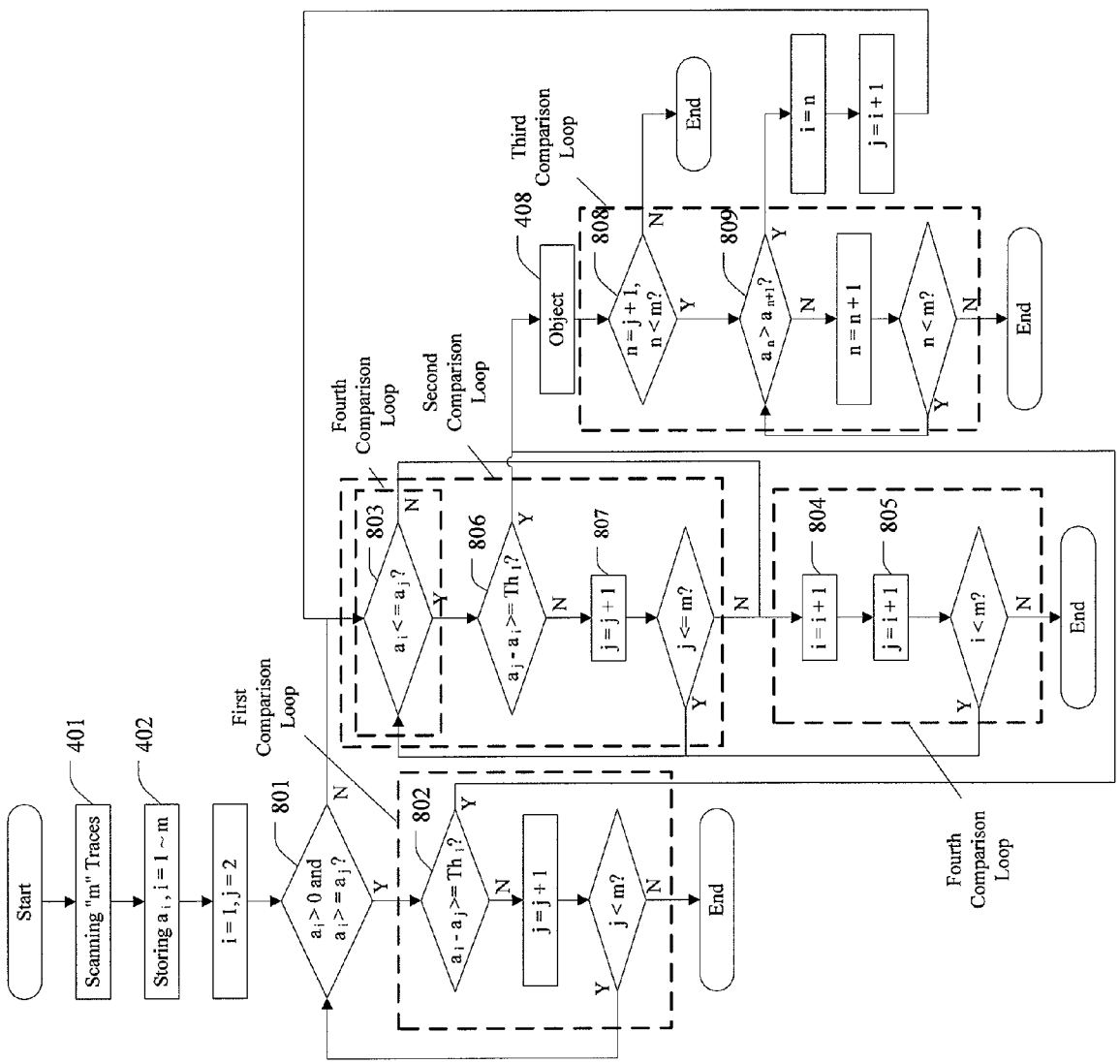
FIG. 8 is a flow diagram of a method of multiple-finger recognition consistent with still another example of the present invention.

FIG. 8 is a flow diagram of a method of multiple-finger recognition consistent with still another example of the present invention. Unlike the method described and illustrated with reference to FIG. 4, which may be configured to identify a local maximum count value (step 404, for example) and determine whether an object is present based on the local maximum count value (step 406, for example), the method illustrated in FIG. 8 may be configured to identify a local minimum count value and use the same as a comparison basis. Referring to FIG. 8, a non-zero count value $a_i$ having an index number most close to the first index number of $a_1$ may be identified and compared with a count value $a_{i+1}$. If the count value $a_i$ is not smaller than $a_j$, at step 802, in a first comparison loop based on the count value $a_i$, the count value $a_i$ may be compared with one of count values following $a_i$ in an increasing order of index number until a count value $a_j$ may be identified. A difference between the count values $a_i$ and $a_j$ may satisfy a first threshold $Th_1$. Based on the first comparison loop, an object at a marginal region such as trace numbered 1 may be identified.

If at step 801 the count value $a_i$ is smaller than or equal to $a_j$, in a second comparison loop based on the count value $a_i$, the count value $a_i$ may be compared with one of count values following $a_i$ in an increasing order of index number until a count value $a_k$ may be identified. A difference between the count values $a_i$ and $a_k$ may satisfy the first threshold $Th_1$.

If an object is identified at step 408, in a third comparison loop, the remaining count values may be retrieved at step 808 and compared at step 809 so as to identify whether a second object may exist. At step 809, a count value $a_n$ may be compared with a count value $a_{n+1}$ to determine whether $a_n$ is greater than $a_{n+1}$. If confirmative, a fourth comparison loop including steps 803 to 805 may be performed by comparing $a_n$ with $a_{n+1}$, in an increasing order of index number. If at step 803 a count value $a_r$ not greater than $a_{r+1}$ is identified, at step 806, the second comparison loop based on $a_r$ and the first threshold may be repeated.

Figures 9C, 9D:
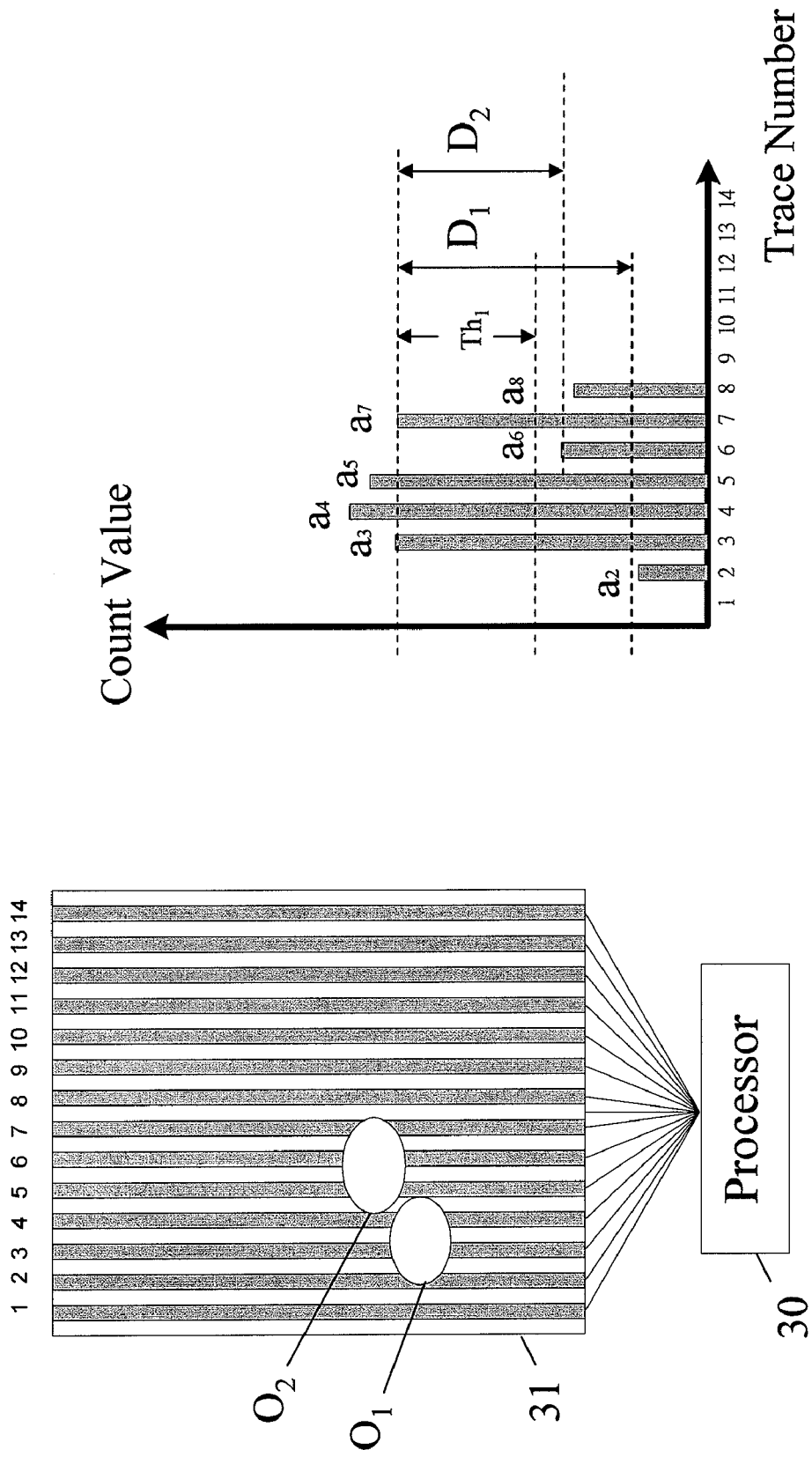

FIGS. 9A to 9D are diagrams illustrating exemplary operations of the method illustrated in FIG. 8. Referring to FIG. 9A, a count value $a_1$ may be detected at step 801 and a count value $a_2$ having an enough distance "D" from the count value $a_1$ may be detected at step 802. As a result, an object present at a margin region of the detection device 31 may be identified.

Referring to FIG. 9B, a non-zero count value $a_5$ may be identified at step 801. A subsequent count value $a_6$ may fail the test at step 802 based on the first threshold $Th_1$ in the first comparison loop. Subsequently, a next subsequent count value $a_7$ may pass the test at step 806 in the second comparison loop. Accordingly, an object may be identified at step 408.

Referring to FIG. 9C, a first object $O_1$ and a second object $O_2$ may be disposed relatively close to each other and thus, as illustrated in FIG. 9D, some of the traces may reflect the capacitance variations due to the presence of both the first object $O_1$ and the second object $O_2$. Referring to FIG. 9D, count values $a_2$ and $a_3$ may be identified at steps 801 and 806, respectively, and thus the first object $O_1$ is identified. Furthermore, after steps 808 and 809, a count values $a_6$ may be identified at step 801 in the fourth comparison loop. Subsequently, a count value $a_7$ may pass the test at step 806. Accordingly, the second object $O_2$ is identified.

Figure 10:
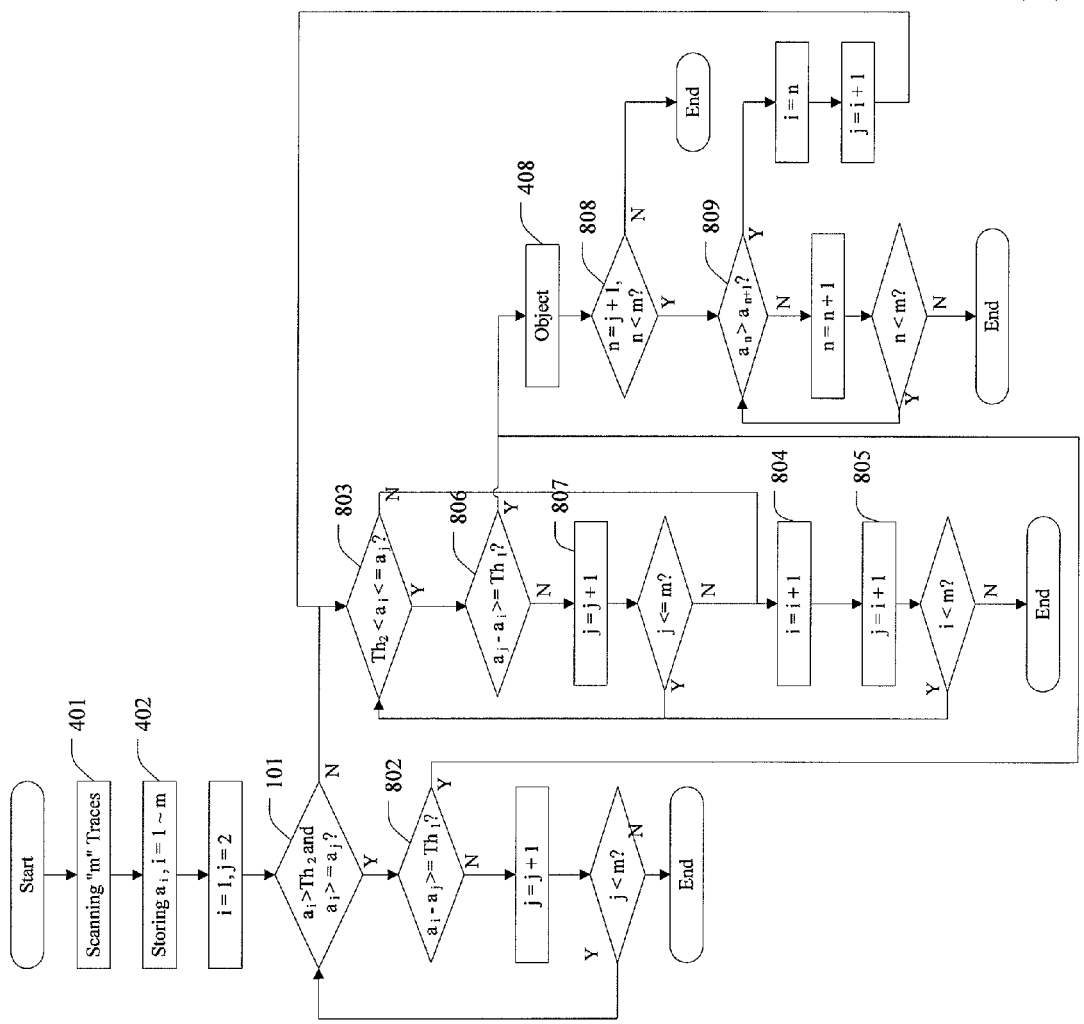
FIG. 10 is a flow diagram of a method of multiple-finger recognition consistent with yet another example of the present invention.

FIG. 10 is a flow diagram of a method of multiple-finger recognition consistent with yet another example of the present invention. Referring to FIG. 10, the method may be similar to that described and illustrated with reference to FIG. 8 except that, for example, a comparison based on a second threshold $Th_2$ is employed. Specifically, at step 101, each of the count values may be compared with the second threshold $Th_2$ until a count value satisfies the second threshold is found. The second threshold may facilitate the recognition process because comparison for some count values disqualified by the second threshold may be eliminated.

It will be appreciated by those skilled in the art that changes could be made to the preferred embodiments described above without departing from the broad inventive concept thereof. It is understood, therefore, that this invention is not limited to the particular embodiments disclosed, but is intended to cover modifications within the spirit and scope of the present application as defined by the appended claims.

Further, in describing certain illustrative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

That which is claimed is:

1. A method of identifying objects on a touch-sensitive device, the method comprising:
    scanning a plurality of "m" traces of the touch-sensitive device, m being a positive integer;
    obtaining a count value of each of the "m" traces, wherein an x-th trace has a count value $a_x$, x being an index number from 1 to m;
    comparing a count value a; with a count value $a_{i+1}$ in an increasing order of index number in a first comparison process until a count value $a_j$ not smaller than $a_{j+1}$ is identified, i and j being positive integers; and
    based on the count value $a_j$, comparing the count value $a_j$ with one of count values following $a_j$ in an increasing order of index number in a second comparison process until a count value $a_k$ is identified, k being a positive integer, wherein a difference between the count values $a_j$ and $a_k$ satisfies a first threshold.

2. The method of claim 1 further comprising:
before identifying the count value $a_j$, comparing the count values with a second threshold in an increasing order of index number until one of the count values satisfies the second threshold.

3. The method of claim 1 further comprising:
identifying a first object when the difference between the count values $a_i$ and $a_k$ is not smaller than the first threshold; and
comparing a count value $a_{k+1}$ with a count value $a_{k+2}$ in an increasing order of index number in a third comparison process until a count value $a_n$ smaller than $a_{n+1}$ is identified.

4. The method of claim 3 further comprising:
comparing the count value $a_n$ with the count value $a_{n+1}$ in an increasing order of index number in the first comparison process until a count value $a_p$ not smaller than $a_{p+1}$ is identified; and
based on the count value $a_p$, comparing the count value $a_p$ with one of count values following $a_p$ in an increasing order of index in the second comparison process until a count value $a_q$ is identified, wherein a difference between the count values $a_p$ and $a_q$ satisfies the first threshold.

5. The method of claim 4 further comprising:
identifying a second object when the difference between the count values $a_p$ and $a_q$ is not smaller than the first threshold; and
comparing a count value $a_{q+1}$ with a count value $a_{q+2}$ in an increasing order of index number in the third comparison process.

6. The method of claim 1 further comprising:
identifying that a last count value $a_m$ is compared in the second comparison process;
identifying a non-zero count value $a_r$ having an index number most close to the last index number of the last count value $a_m$, being an integer from m to 1; and
based on the count value $a_r$, comparing the count value $a_r$ with one of count values preceding $a_r$ in a decreasing order of index number in a fourth comparison process until a count value $a_s$ is identified, wherein a difference between the count values $a_r$ and $a_s$ satisfies the first threshold.

7. A method of identifying objects on a touch-sensitive device, the method comprising:
scanning a plurality of "m" traces of the touch-sensitive device, m being a positive integer;
obtaining a count value of each of the "m" traces, wherein an x-th trace has a count value $a_x$, x being an index number from 1 to m;
identifying a non-zero count value $a_i$ having an index number most close to the first index number of a first count value $a_1$, i being an integer from 1 to m;
comparing the count value $a_i$ with a count value $a_{i+1}$;
if the count value $a_i$ is not smaller than the count value $a_{i+1}$, based on the count value $a_i$, comparing the count value $a_i$ with one of count values following $a_{i+1}$, in an increasing order of index number in a first comparison process until a count value $a_j$ is identified, j being a positive integer, wherein a difference between the count values $a_i$ and $a_j$ satisfies a first threshold; and
if the count value $a_i$ is smaller than the count value $a_{i+1}$, based on the count value $a_i$, comparing the count value $a_i$ with one of count values following $a_i$ in an increasing order of index number in a second comparison process until a count value $a_k$ is identified, k being a positive integer, wherein a difference between the count values $a_i$ and $a_k$ satisfies the first threshold.

8. The method of claim 7, wherein identifying the non-zero count value $a_i$ further comprises:
comparing the count values with a second threshold in an increasing order of index number until one of the count values satisfies the second threshold.

9. The method of claim 7 further comprising:
identifying a first object when the difference between the count values $a_i$ and $a_j$ is not smaller than the first threshold; and
comparing a count value $a_{j+1}$ with a count value $a_{j+2}$ in an increasing order of index number in a third comparison process until a count value $a_n$ greater than $a_{n+1}$ is identified.

10. The method of claim 9 further comprising:
comparing the count value $a_n$ with the count value $a_{n+1}$ in an increasing order of index number in a fourth comparison process until a count value $a_p$ smaller than $a_{p+1}$ is identified; and
based on the count value $a_p$, comparing the count value $a_p$ with one of count values following $a_p$ in an increasing order of index in the second comparison process until a count value $a_q$ is identified, wherein a difference between the count values $a_p$ and $a_q$ satisfies the first threshold.

11. The method of claim 10 further comprising:
identifying a second object when the difference between the count values $a_p$ and $a_q$ is not smaller than the first threshold; and
comparing a count value $a_{q+1}$ with a count value $a_{q+2}$ in an increasing order of index number in the third comparison process.

12. A method of identifying objects on a touch-sensitive device, the method comprising:
scanning a plurality of traces of the touch-sensitive device;
obtaining count values of the plurality of traces, each of the count values having an index number related to the location of one of the traces;
identifying a first count value in a first portion of the count values, the first count value having one of a local maximum value and a local minimum value among the first portion of the count values;
determining whether a difference between the first count value and one of count values following the first count value satisfies a first threshold;
identifying a first object if the difference between the first count value and the one count value satisfies the first threshold;
identifying that a difference between the first count value and a last count value does not satisfies the first threshold;
identifying a non-zero count value having an index number most close to the last index number of the last count value;
based on the non-zero count value, comparing the non-zero count value with one of count values preceding the non-zero count value in a decreasing order of index number; and
identifying an object if a difference between the non-zero count value and one of the count values preceding the non-zero count value satisfies the first threshold.

13. The method of claim 12, wherein determining whether a difference between the first count value and one of count values following the first count value further comprises:
based on the first count value, comparing the first count value with one of count values following the first count value in an increasing order of index number until the one count value is identified.

14. The method of claim 12 further comprising:
before identifying the first count value, comparing the count values with a second threshold in an increasing order of index number until a second count value satisfies the second threshold; and identifying the first count value from a group of count values including the second count value and count values following the second count value.

15. The method of claim 12 further comprising:
after identifying the first object, determining whether a second portion of the count values following the first portion of the count values exists by comparing one count value with another in an increasing order of index number for count values following the one count value.

16. The method of claim 15 further comprising:
identifying a second count value in the second portion of the count values, the second count value having one of a local maximum value and a local minimum value among the second portion of the count values.

17. The method of claim 16 further comprising:
based on the second count value, comparing the second count value with one of count values following the second count value in an increasing order of index number; and
identifying a second object if a difference between the second count value and one of the count values following the second count value satisfies the first threshold.

18. The method of claim 12 further comprising:
identifying a non-zero count value having an index number most close to the first index number of a first count value;
based on the non-zero count value, comparing the non-zero count value with one of count values following the non-zero count value in an increasing order of index number; and
identifying an object if a difference between the non-zero count value and one of the count values following the non-zero count value satisfies the first threshold.

19. A system for identifying objects on a touch-sensitive device, the system comprising:
a detection device configured to scan a plurality of "m" traces of the touch-sensitive device, m being a positive integer;
a converter configured to generate a count value of each of the "m" traces, wherein an x-th trace has a count value $a_x$, x being an index number from 1 to m;
a first comparator configured to compare a count value $a_i$ with a count value $a_{j+1}$ in an increasing order of index number in a first comparison process until a count value $a_j$ not smaller than $a_{j+1}$ is identified, i and j being positive integers; and
a second comparator configured to be based on the count value $a_j$, compare the count value $a_j$ with one of count values following $a_j$ in an increasing order of index number in a second comparison process until a count value $a_k$ is identified, k being a positive integer, wherein a difference between the count values $a_i$ and $a_k$ satisfies a first threshold.

20. The system of claim 19, wherein one of the first and second comparators is configured to compare the count values with a second threshold in an increasing order of index number until one of the count values satisfies the second threshold.

21. The system of claim 19 further comprising:
a control unit configured to identify a first object when the difference between the count values $a_i$ and $a_k$ is not smaller than the first threshold, wherein one of the first and second comparators is configured to compare a count value $a_{k+1}$ with a count value $a_{k+2}$ in an increasing order of index number in a third comparison process until a count value $a_n$ smaller than $a_{n+1}$ is identified.

22. The system of claim 19, wherein one of the first and second comparators is configured to identify a non-zero count value $a_r$ having an index number most close to the last index number of the last count value $a_m$, r being an integer from m to 1, and based on the count value $a_r$, compare the count value $a_r$ with one of count values preceding $a_r$ in a decreasing order of index number in a fourth comparison process until a count value $a_s$ is identified, wherein a difference between the count values $a_r$ and $a_s$ satisfies the first threshold.

23. A system for identifying objects on a touch-sensitive device, the system comprising:
a detection device configured to scan a plurality of "m" traces of the touch-sensitive device, m being a positive integer;
a converter configured to generate a count value of each of the "m" traces, wherein an x-th trace has a count value $a_x$, x being an index number from 1 to m;
a first comparator configured to identify a non-zero count value $a_i$ having an index number most close to the first index number of a first count value $a_1$, i being an integer from 1 to m, and compare the count value $a_i$ with a count value $a_{i+1}$;
wherein the first comparator, if the count value $a_i$ is not smaller than the count value $a_{i+1}$, based on the count value compares the count value $a_i$ with one of count values following $a_i$ in an increasing order of index number in a first comparison process until a count value $a_j$ is identified, i and j being positive integers, wherein a difference between the count values $a_i$ and $a_j$ satisfies a first threshold; and
a second comparator configured to, if the count value $a_i$ is smaller than the count value $a_{i+1}$, based on the count value $a_i$, compare the count value $a_i$ with one of count values following $a_i$ in an increasing order of index number in a second comparison process until a count value $a_k$ is identified, k being a positive integer wherein a difference between the count values $a_i$ and $a_k$ satisfies the first threshold.

24. The system of claim 23, wherein the first comparator is configured to compare the count values with a second threshold in an increasing order of index number until one of the count values satisfies the second threshold so as to identify the non-zero count value $a_i$.

25. The system of claim 23 further comprising:
a control unit configured to identify a first object when the difference between the count values $a_i$ and $a_j$ is not smaller than the first threshold, wherein one of the first and second comparator is configured to compare a count value $a_{j+1}$ with a count value $a_{j+2}$ in an increasing order of index number in a third comparison process until a count value $a_n$ greater than $a_{n+1}$ is identified.

26. The system of claim 25, wherein one of the first and second comparators is configured to compare the count value $a_n$ with the count value $a_n+1$ in an increasing order of index number in a fourth comparison process until a count value $a_p$ smaller than $a_{p+1}$ is identified, and wherein the second comparator is configured to be based on the count value $a_p$, compare the count value $a_p$ with one of count values following $a_p$ in an increasing order of index in the second comparison process until a count value $a_q$ is identified, wherein a difference between the count values $a_p$ and $a_q$ satisfies the first threshold.

* * * * *